Feb. 26, 1929.
O. H. GOETZ
1,703,666
AUTOMOBILE BUMPER
Original Filed Oct. 5, 1925
Fig. 2,
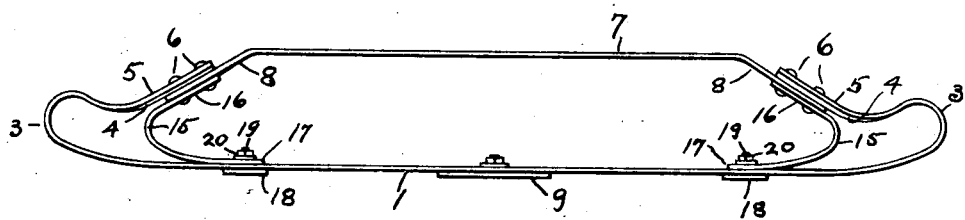
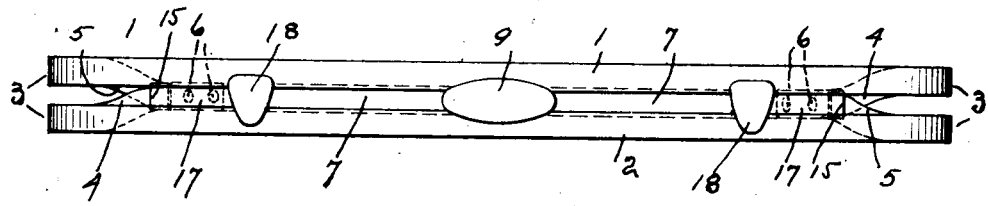
Fig. 1,
INVENTOR.
BY
ATTORNEYS.

Patented Feb. 26, 1929.

1,703,666

UNITED STATES PATENT OFFICE.

OSCAR H. GOETZ, OF CHICAGO, ILLINOIS, ASSIGNOR TO AMERICAN CHAIN COMPANY, INC., A CORPORATION OF NEW YORK.

AUTOMOBILE BUMPER.

Original application filed October 5, 1925, Serial No. 60,405. Divided and this application filed May 16, 1928. Serial No. 278,171.

This invention relates to automobile bumpers and has for an object the provision of a spring-bar-bumper comprising an impact section including a plurality of flat metal bars superimposed in the same vertical plane and spaced vertically, extending all the way across the front of the bumper and having their ends recurved to form individual end loops, the recurved ends of the component members being edge bent diagonally toward each other and meeting, near the loops, at a point where the ends are joined to each other and are also joined to the ends of a rear bar which extends for a considerable portion of its length in substantial parallelism with the impact bars, serving to connect the joints above mentioned and also being adapted to receive clamps or other attaching means by which the bumper structure in its entirety may be supported from a vehicle.

The bumper above described constitutes a shock absorbing structure notably efficient, possessing sufficient resiliency to absorb ordinary impacts without undue shock to the vehicle or its occupants, and at the same time affording sufficiently rigid structure to resist more violent impacts and provide for their complete absorption.

The above described bumper forms the subject of generic claims in my copending application Serial No. 60,405, filed October 5, 1925, from which the present application has been divided.

A further object of the present invention is to provide a modified bumper of the above type in which means are provided to connect the rear bar and impact members at one or more points between the ends thereof, such means taking the form of a plurality of spacing or cushion members which are preferably interposed between the rear bar and the impact bars toward the ends of the impact section.

These cushion members are preferably secured both to the rear and to the impact bars, as for example, by clamps extending between and connecting the impact bars to each other and to one end of the cushion members, the other ends of the cushion members being desirably bolted or riveted to the ends of the recurved loop members and also to the ends of the rear bar, at the joints therebetween.

Such additional connections between the rear bar and the impact bars afford additional rigidity at regions where impacts of unusual violence may be expected in use.

Other features of the invention will appear from the subjoined specification and claims and are illustrated in the drawings.

In the drawings,

Fig. 1 is a view in front elevation of an automobile bumper in the construction of which the invention has been embodied.

Fig. 2 is a plan view thereof.

In the illustrated embodiment, referring to Figs. 1 and 2, the reference numerals 1 and 2 designate upper and lower impact bars, preferably formed of flat resilient strips of steel arranged in the same vertical plane and spaced vertically, substantially as illustrated, these bars extending throughout the entire length of the bumper, and constituting an impact section at the ends of which the bars 1 and 2 are recurved to form separate loops 3 preferably lying each in the horizontal plane of its particular impact member, and beyond these loops the end portions 4 and 5 of members 1 and 2 are shown as edge-bent diagonally toward each other, joining at a region near the ends of the loops, where they are secured together as indicated at 6, by suitable devices such as rivets or bolts.

In pursuance of the invention a rear bar is shown at 7 extending in substantial parallelism with the impact section and spaced therefrom throughout the greater, or a lesser, portion of its length, as may be desired, the form of rear bar illustrated in Figs. 1 and 2 being parallel with, and spaced from, the impact section, for substantially the entire length of the rear bar, and each end of the rear bar is bent forward as at 8 into substantial parallelism with the diagonally bent end members 4 and 5, to which the end portions 8 of the rear bar are preferably secured, as for example by the same bolts and rivets 6 which connect the impact bars to each other, so that a single joint suffices to complete the bumper structure at these regions.

The impact members are desirably connected to each other also by clamps 9 and 18 which also serve as means to maintain the vertically spaced relation of the impact members.

The bumper may be attached to a vehicle by any suitable devices, not shown, these devices being customarily attached to the rear bar 7 at points between the center and ends thereof on each side of the center.

In further pursuance of the invention, I provide a spacing member or flexible cushion 15 near each loop 3, and preferably interposed between the impact section and rear bar at the region of the joint 6 on each side, the member 15 having one of its ends secured to the recurved loop ends 4 and 5 by the same rivets or bolts 6 which connect the ends 4 and 5 with the ends 8 of the rear bar, the ends 8 being embraced between the end portion 16 of the member 15 and the loop end portions 4 and 5.

The forward ends 17 of the members 15 extend toward, and are preferably secured to, the impact section, as by means of the clamps 18 which connect the top and bottom impact bars to each other and which are connected in turn to the portion 17 of the members 15 by bolts 19 and nuts 20.

This form of bumper provides for a somewhat greater rigidity, of a yielding character however, in the vicinity of each of the end loops 3, than in bumpers not having said cushion members, and this type of structure is particularly serviceable where heavy impacts are to be guarded against, proceeding toward the ends of the bumper.

Having described my invention, I claim:—

1. A bumper comprising a rear bar, and an impact section including a plurality of vertically spaced parallel front bars extending throughout the length of the bumper and recurved to form end loops connected to each other and to the rear bar by diagonal members, and spacing members between said rear bar and impact section near the ends of the latter.

2. A bumper comprising a rear bar, and an impact section including a plurality of vertically spaced parallel front bars extending throughout the length of the bumper and recurved to form end loops connected to each other and to the rear bar by diagonal members, and curved cushion spacing members secured to said impact section near the end loops and secured also to the aforesaid rear connecting joints.

3. A bumper comprising a rear bar, and an impact section including a plurality of vertically spaced parallel front bars extending throughout the length of the bumper and recurved to form end loops connected to each other and to the rear bar by diagonal members, and curved cushion spacing members secured to said impact section near the end loops and secured also to the aforesaid rear connecting joints by devices passing through said cushion members and loop ends with the corresponding ends of said rear bar embraced therebetween.

In testimony whereof, I have signed this specification.

OSCAR H. GOETZ.